United States Patent
Conover et al.

(10) Patent No.: US 7,552,479 B1
(45) Date of Patent: Jun. 23, 2009

(54) DETECTING SHELLCODE THAT MODIFIES IAT ENTRIES

(75) Inventors: Matthew Conover, East Palo Alto, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 864 days.

(21) Appl. No.: 11/088,144

(22) Filed: Mar. 22, 2005

(51) Int. Cl.
*G06F 12/14* (2006.01)
*H04L 9/00* (2006.01)

(52) U.S. Cl. .................................. 726/24; 713/164
(58) Field of Classification Search .................. 726/24
See application file for complete search history.

(56) References Cited

U.S. PATENT DOCUMENTS

| | | | |
|---|---|---|---|
| 7,111,279 B2* | 9/2006 | Gazdik et al. | 717/110 |
| 7,165,076 B2* | 1/2007 | Bentley | 707/104.1 |
| 2005/0108562 A1* | 5/2005 | Khazan et al. | 713/200 |
| 2005/0198507 A1* | 9/2005 | Brender et al. | 713/170 |

OTHER PUBLICATIONS

Rabek et al., "Detection of Injected, Dynamically Generated, and Obfuscated Malicious Code", Oct. 27, 2003, ACM, pp. 76-82.*
Butler, J., and anonymous author, "*Bypassing 3rd Party Windows Buffer Overflow Protection*", Phrack Inc., vol. 0x0b, Issue 0x3e, Phile #0x05 of 0x10, Jul. 13, 2004, pp. 1-17 [online]. Retrieved from the Internet:<URL:http://www.phrack.org/phrack/62/p62-0x05_Bypassing_Win_BufferOverflow_Protection.txt>.
Pietrek, Matt, "*An In-Depth Look into the Win32 Portable Executable File Format*", MSDN Magazine, Feb. 2002, pp. 1-13 [online]. Retrieved from the Internet:<URL:http://msdn.microsoft.com/msdnmag/issues/02/02/PE/default.aspx>.
Pietrek, Matt, "*An In-Depth Look into the Win32 Portable Executable File Format, Part 2*", MSDN Magazine, Mar. 2002, pp. 1-12 [online]. Retrieved from the Internet:<URL:http://msdn.microsoft.com/msdnmag/issues/02/03/PE2/default.aspx>.

* cited by examiner

*Primary Examiner*—Matthew B Smithers
(74) *Attorney, Agent, or Firm*—Gunnison, McKay & Hodgson, L.L.P.; Serge J. Hodgson (57) ABSTRACT

On start up of a process, a critical imported functions table including resolved addresses of critical imported functions that an application, such as a host intrusion detection system application depends upon to have data integrity, is dynamically allocated and marked read only to impede modification by malicious code. The critical imported functions are hooked so that execution of a call to a critical imported function is made using a corresponding entry in the critical imported functions table rather than an entry in a current process IAT, which may have been modified by malicious code. The current process IAT is evaluated to determine whether it has changed from an initial start up state, in a way that is indicative of an evasion attempt by malicious code. If an evasion attempt is detected, a notification is provided to a user and/or system administrator. Optionally, protective action is taken, such as saving a copy of the current process IAT to permit later analysis of the change.

20 Claims, 7 Drawing Sheets

KEY TO FIG. 2

DETECTING SHELLCODE THAT MODIFIES IAT ENTRIES

BACKGROUND OF THE INVENTION

1. Field of the Invention

The present invention relates to the protection of computer systems. More particularly, the present invention relates to detection of malicious code.

2. Description of Related Art

Intrusion detection systems are widely used on computer systems to protect the computer systems from exploitation by malicious code, commonly termed shellcode. When structures utilized by the intrusion detection systems themselves are compromised, the malicious code can evade detection by the intrusion detection systems and exploit the computer systems.

SUMMARY OF THE INVENTION

In accordance with one embodiment, a method includes generating a critical imported functions table including an address in memory of a critical imported function. A call to the critical imported function is hooked, and execution of the call is redirected from a current process import address table (IAT) entry in a current process IAT to a corresponding critical imported functions table entry in the critical imported functions table. The current process IAT corresponding to the critical imported function is evaluated to determine whether a malicious code evasion attempt is detected. If an evasion attempt is detected, a user and/or system administrator is notified. Optionally protective action is taken, such as saving a copy of the current process IAT for later analysis.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Executable applications used on Windows® operating systems conventionally utilize the Portable Executable (PE) file format. The PE file format is composed of multiple data structures that define an executable file. The PE file format is documented in Windows® NT and Windows® 2000 software developer's kits (SDKs) (available from Microsoft, Inc. of Redmond, Wash.) and is well-known to those of skill in the art.

When an executable application uses code or data from shared libraries, e.g., dynamically linked libraries (DLLs), this is termed importing functions. When an executable application, e.g., a PE file, is loaded, the Windows® (hereinafter Windows) operating system imports the shared libraries that the application uses and maps them into the process address space of the application. As Windows operating systems utilize virtual memory management, the addresses in memory at which the functions are located are not static.

Within a PE file, there is an array of data structures, one per imported shared library, and each of these data structures gives the name of the imported shared library and points to an array of function pointers, also termed herein entries. The array of entries is known as the import address table (IAT). Windows operating systems utilize the IAT to map an imported function to an address in memory. When a process first starts up, typically the IAT is a mirror of the import lookup table, and is later filled in with runtime addresses.

Each imported function has a particular location in an IAT where its corresponding entry is written. Herein an entry in an IAT can be a function pointer identifying a path to the location of the imported function in memory, for example, a jump instruction to thunk code that is used to determine the address of the imported function, or can be the actual address of the imported function in memory, for example, an offset.

In some applications, the IAT entry for an imported function is resolved to the address of the imported function by the Windows operating system when the application is loaded, e.g., at start up. This type of binding is termed herein non-lazy binding.

In other applications, the IAT entry for an imported function is not resolved to the address of the imported function by the Windows operating system when the application is loaded. Instead the IAT entry is a function pointer, such as a jump instruction, to intermediate code termed thunk code present in the process address space. The thunk code is used to resolve the address of the imported function at the time the imported function is called and the function pointer is overwritten with the resolved address. This type of binding is termed herein lazy binding.

Typically when a host intrusion detection system (HIDS) application is implemented in a computer system using a Windows operating system, the HIDS application utilizes the operating system APIs to access selected imported functions of the shared libraries, for example, "NtQueryvirtualMemory" in ntdll.dll or "Virtual Query" in kernel32.dll, and perform security analyses. More particularly, the HIDS application is executing within the context, e.g., the address space, of whatever process it is trying to protect. Thus, the HIDS application accesses imported functions it needs through the process IAT(s).

If malicious shellcode, herein termed malicious code, were to change the IAT entries used by the HIDS application, an attacker could redirect use of the imported functions to functions supplied by the malicious code and evade detection. In particular, an attacker could control the return value of imported functions and cause a HIDS application to assume execution is safe when in fact the computer system is being exploited, for example, a buffer overflow has occurred.

Figure 2A:
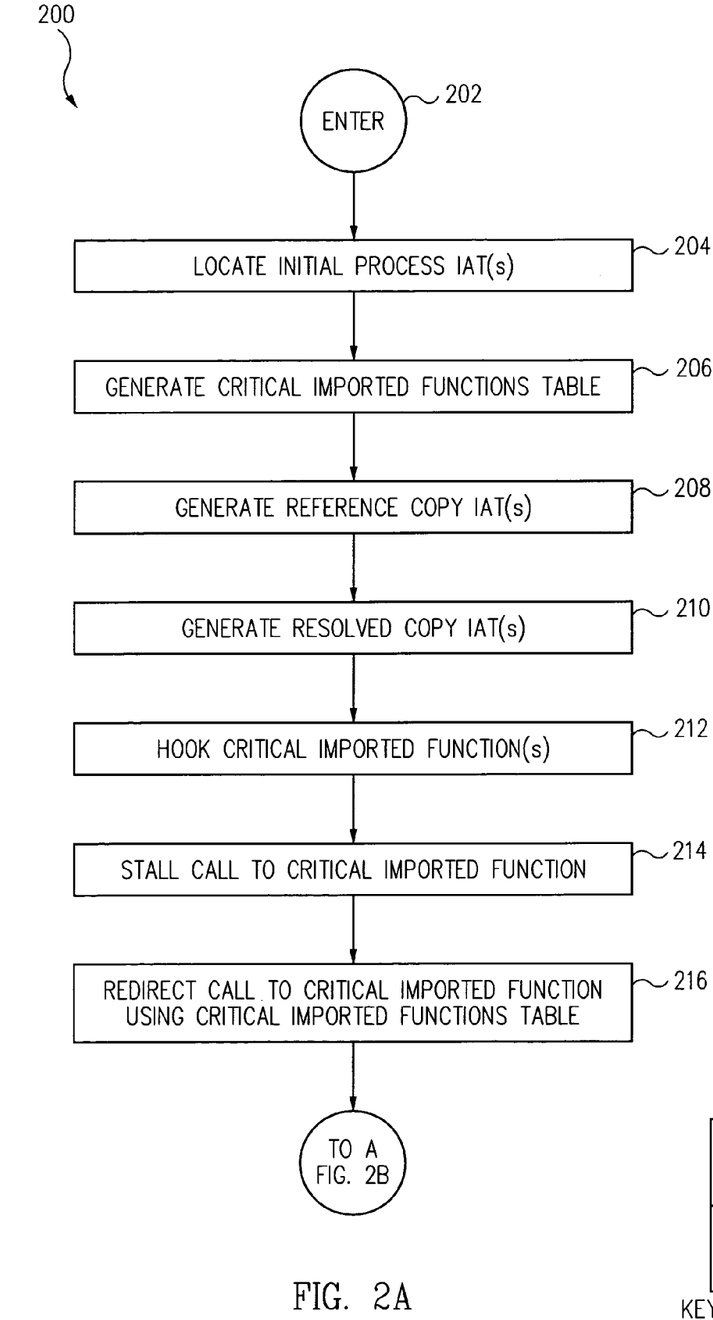
FIG. 2 is a key to FIGS. 2A and 2B that illustrate a flow diagram of a method implemented by the detection application of FIG. 1 in accordance with one embodiment of the invention.
Figure 2B:
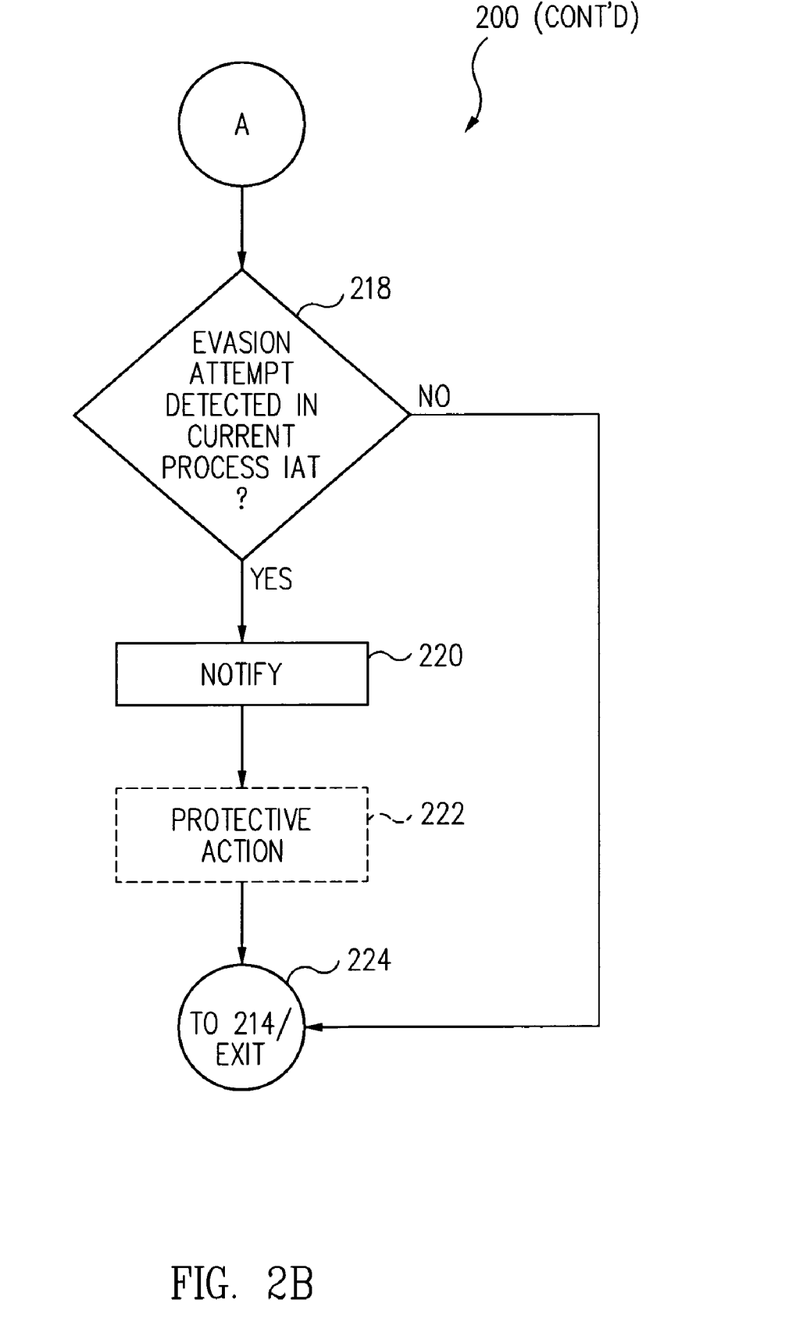

Referring generally to FIGS. 2A and 2B, in one embodiment, at start up of a process protected by a HIDS application, the initial process IAT(s) associated with a process are located (operation 204) and initial process IAT entries corresponding to critical imported functions are resolved and written into a critical imported functions table that is dynamically allocated and marked read-only (operation 206). Each initial process IAT that includes a critical imported function is copied as a reference copy IAT that is dynamically allocated and marked read-only (operation 208). Each entry in the reference copy IAT is resolved to the address of the corresponding function and written into a resolved copy IAT that is dynamically allocated and marked read-only (operation 210). The critical imported functions are hooked, for example by hooking a system call table utilized by the process (operation 212). A call to a critical imported function is stalled (operation 214) and execution of the call is redirected to a corresponding entry in the critical imported functions table, rather than a corresponding entry in a current process IAT (operation 216). The current process IAT is evaluated to determine whether a malicious code evasion attempt is detected (operation 218), and if so, a user and/or system administrator is notified (operation 220). Optionally, protective action is taken (operation 222), such as saving a copy of the current process IAT for later evaluation.

Embodiments in accordance with the invention, redirect calls to functions that a HIDS application depends upon for data integrity to a critical imported functions table that was resolved at start up, dynamically allocated, and marked read only rather than to a current process IAT that may have been modified by malicious code attempting to evade detection. The redirection is further used as an opportunity to evaluate the corresponding current process IAT for changes that are indicative of malicious code attempting to evade detection.

Herein, in one embodiment, malicious code is defined as any computer program, module, set of modules, or code that enters a computer system environment without an authorized user's knowledge and/or without an authorized user's consent. A computer virus that modifies process IAT entries to avoid detection is one example of a malicious code.

Figure 1:
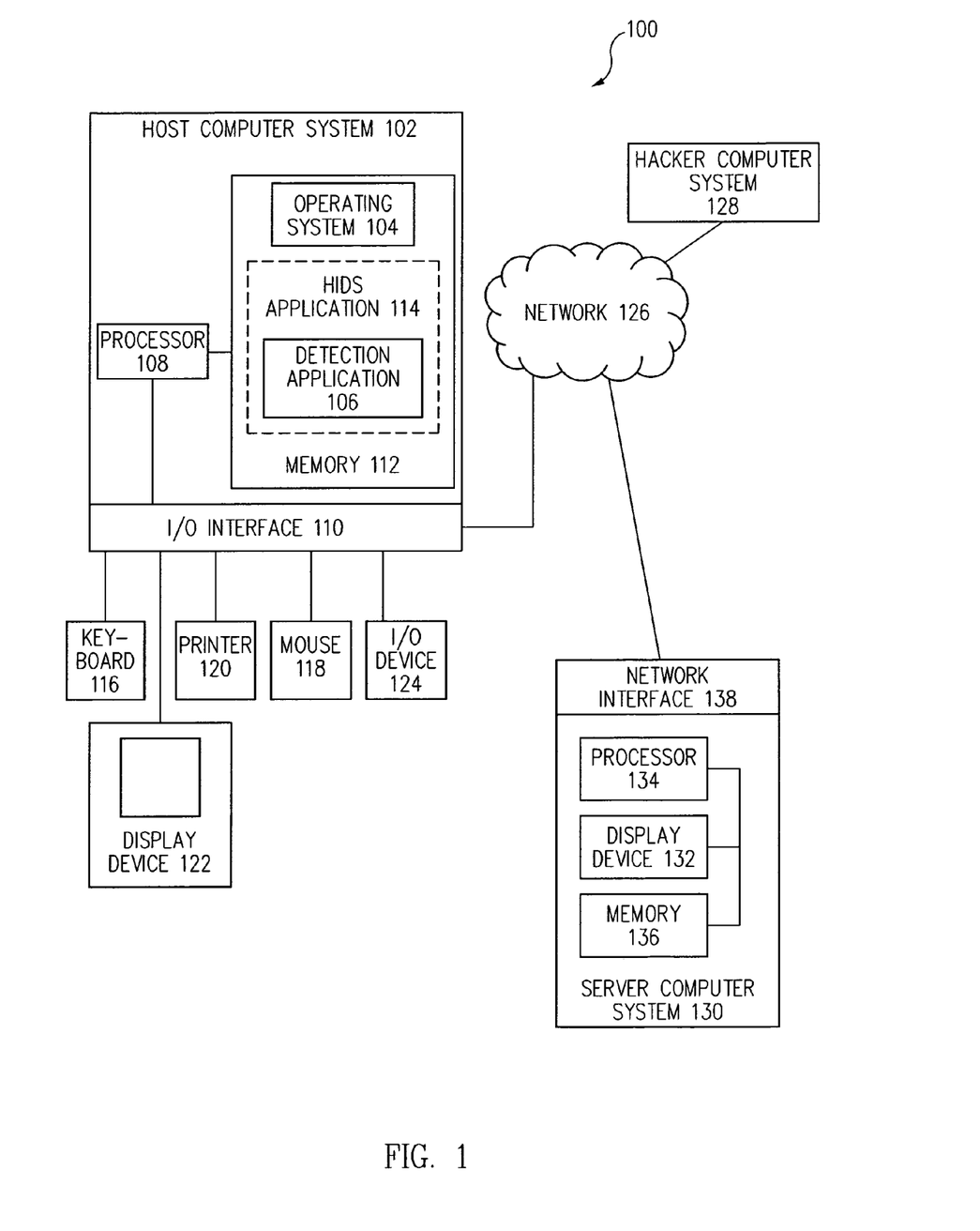
FIG. 1 illustrates a client-server system that includes a detection application executing on a host computer system in accordance with one embodiment of the present invention.

FIG. 1 is a diagram of a client-server system 100 that includes a detection application 106 executing on a host computer system 102 in accordance with one embodiment of the present invention. Host computer system 102, can be a stand-alone computer system, such as a personal computer or workstation, as illustrated in FIG. 1. Host computer system 102, e.g., a first computer system, can also be part of a client-server configuration that is also illustrated in FIG. 1 in which computer system 102 interacts with a server computer system 130, e.g., a second computer system, via a network 126. Network 126 can be any network or network system that is of interest to a user, for example, the Internet.

Detection application 106 is described herein as executed on host computer system 102, however, in light of this disclosure, those of skill in the art can understand that the description is applicable to a client-server system as well. Host computer system 102 typically includes a central processing unit (CPU) 108, hereinafter processor 108, an input/output (I/O) interface 110, an operating system 104, and a memory 112.

Host computer system 102 may further include standard devices, such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, memory 112 includes a main memory, as well as any supplemental memories, and includes executable areas, data storage areas, and any memory areas needed by host computer system 102.

In one embodiment, detection application 106 is loaded into host computer system 102 via I/O device 124, such as from a CD, DVD or floppy disk containing detection application 106. In other embodiments, such as client-server embodiments, detection application 106 can be downloaded into host computer system 102 from server computer system 130 via network 126. Server computer system 130 can further include: a network interface 138 for communicating with network 126; a memory 136; a processor 134; and, a display device 132. In various embodiments, network interface 138 and I/O interface 110 include analog modems, digital modems, or a network interface card.

In FIG. 1, host computer system 102 is also coupled to an hacker computer system 128, by network 126, from which malicious code may be received, such as via a file containing malicious code. In one embodiment, hacker computer system 128 is similar to host computer system 102, for example, includes a central processing unit, an input/output (I/O) interface and a memory. Hacker computer system 128 may further include standard devices like a keyboard, a mouse, a printer, a display device, and an I/O device(s). The various hardware components of hacker computer system 128 are not illustrated to avoid detracting from the principles of the invention.

In the present embodiment, detection application 106 is stored in memory 112 of host computer system 102 and executed on host computer system 102. The particular type and configuration of host computer system 102, server computer system 130, and hacker computer system 128 are not essential to this embodiment of the present invention.

FIG. 2 is a key to FIGS. 2A and 2B that illustrate a flow diagram of a method 200 implemented by detection application 106 in accordance with one embodiment of the invention. In various embodiments, detection application 106 can be implemented independently or as part of another application, such as a host intrusion detection system (HIDS) application. For purposes of description, detection application 106 is described herein as implemented as part of a host intrusion detection system application, e.g., HIDS application 114 (FIG. 1), implemented on computer system 102. Referring now to FIGS. 1 and 2 together, in one embodiment, execution of detection application 106 by processor 108 results in the operations of method 200 as described below.

In the present embodiment, when HIDS application 114 receives notification that a new process, that is to be protected by HIDS application 114, is created, detection application 106 including method 200 is loaded while the process is starting up and method 200 is entered at an ENTER operation 202. From ENTER operation 202, processing transitions to a LOCATE INITIAL PROCESS IAT(s) operation 204.

In LOCATE INITIAL PROCESS IAT(s) operation 204, at start up, i.e., a first time, the initial process IAT(s) are located. For example, in one embodiment, the address(es) of the initial process IAT(s) are determined from the PE directory structure of a process that HIDS application 114 is operating in. Herein an initial process IAT is an IAT of the process at start up of the process and prior to any modifications. From LOCATE INITIAL PROCESS IAT(s) operation 204, processing transitions to a GENERATE CRITICAL IMPORTED FUNCTIONS TABLE operation 206.

In GENERATE CRITICAL IMPORTED FUNCTIONS TABLE operation 206, on start up, a critical imported functions table including the resolved addresses of critical imported functions utilized by HIDS application 114 is generated. In particular, in one embodiment, on start up, IAT entries in initial process IATs corresponding to critical imported functions are resolved to the corresponding addresses in memory of the critical imported functions and are written to a critical imported functions table, for example, a HIDS_DEPENDENT_FUNCS table. In one embodiment, the critical imported functions table is dynamically allocated, e.g., in either stack or heap, on host computer system 102 and the critical imported functions table is marked read-only. Thus in one embodiment, the critical imported functions table is at an address not fixed in memory, e.g., is a dynamically allocated address, and is marked read-only to prevent it from being easily modified, for example, by malicious code.

Herein a critical imported function is any imported function that HIDS application 114 utilizes and depends upon its data integrity. Examples of critical imported functions include "NtQueryvirtualMemory" in ntdll.dll or "Virtual Query" in kernel32.dll, however, fewer, more, or different critical imported functions can be selected. FROM GENERATE CRITICAL IMPORTED FUNCTIONS TABLE operation 206, processing transitions to a GENERATE REFERENCE COPY IAT(s) operation 208.

In GENERATE REFERENCE COPY IAT(s) operation 208, at start up, each initial process IAT that includes a critical imported function is copied and designated a reference copy IAT, for example, an IAT_ORIGINAL_COPY. In one embodiment, the reference copy IAT(s) are dynamically allocated, e.g., in either stack or heap, and are marked read-only. Thus in one embodiment, a reference copy IAT is a copy of an initial process IAT, i.e., in the start up state, that includes a critical imported function. From GENERATE REFERENCE COPY IAT(s) operation 208, processing transitions to a GENERATE RESOLVED COPY IAT(s) operation 210.

In GENERATE RESOLVED COPY IAT(s) operation 210, each IAT entry in a reference copy IAT is resolved to the corresponding address in memory of the critical imported function and written to a corresponding resolved copy IAT, for example, an IAT_RESOLVED_COPY. In one embodiment, the resolved copy IAT(s) are dynamically allocated, e.g., in either stack or heap, and marked read-only. From GENERATE RESOLVED COPY IAT(s) operation 210, processing transitions to a HOOK CRITICAL IMPORTED FUNCTION(s) operation 212.

In HOOK CRITICAL IMPORTED FUNCTION(s) operation 212, the critical imported function(s) utilized by HIDS application 114 are hooked so that a call to, or other invocation of, a critical imported function is redirected from a corresponding entry in a current process IAT to detection application 106, e.g., to a hook module of detection application 106. As is well known to those of skill in the art, hooking a function allows a process to intercept calls to, or the invocation of, a function on a program wide or operating system wide basis prior to execution. In the present embodiment, at least one critical imported function is hooked. Herein a current process IAT is an IAT of the process after start up of the application and may include modified entries.

For example, in one embodiment, a system call table utilized by operating system 104 is hooked so that calls to, or other invocations of, critical imported functions are redirected to detection application 106, e.g., to a hook module of detection application 106. In particular, in one embodiment, pointers in the system call table corresponding to the critical imported functions are overwritten with new pointers to detection application 106, e.g., to a hook module of detection application 106.

When the critical imported function(s) are hooked, method 200 waits, for example, in a stand-by mode, until a call to, or other invocation of, a hooked critical imported function is originated and redirected to detection application 106, e.g., to a hook module of detection application 106. From HOOK CRITICAL IMPORTED FUNCTION(s) operation 212, processing transitions to a STALL CALL TO CRITICAL IMPORTED FUNCTION operation 214.

In STALL CALL TO CRITICAL IMPORTED FUNCTION operation 214, a call to, or other invocation of, a hooked critical imported function is stalled, i.e., is prevented from reaching the operating system. In one embodiment, the call is stalled by detection application 106, e.g., by a hook module of detection application 106. From STALL CALL TO CRITICAL IMPORTED FUNCTION operation 214, processing transitions to a REDIRECT CALL TO CRITICAL IMPORTED FUNCTION USING CRITICAL IMPORTED FUNCTIONS TABLE operation 216.

In REDIRECT CALL TO CRITICAL IMPORTED FUNCTION USING CRITICAL IMPORTED FUNCTIONS TABLE operation 216, the call to, or other invocation of, the critical imported function is made through the critical imported functions table. Thus, rather than the critical imported function being accessed through a corresponding IAT entry in a corresponding current process IAT, which may have been modified by malicious code, the critical imported function is accessed through a corresponding entry in the critical imported functions table generated in operation 206.

In this way HIDS application 114 utilizes an address of the critical imported function that was resolved at start up, dynamically allocated, and marked read only, i.e., in the critical imported functions table, and is thus assumed less susceptible to modification by malicious code.

Figure 5:
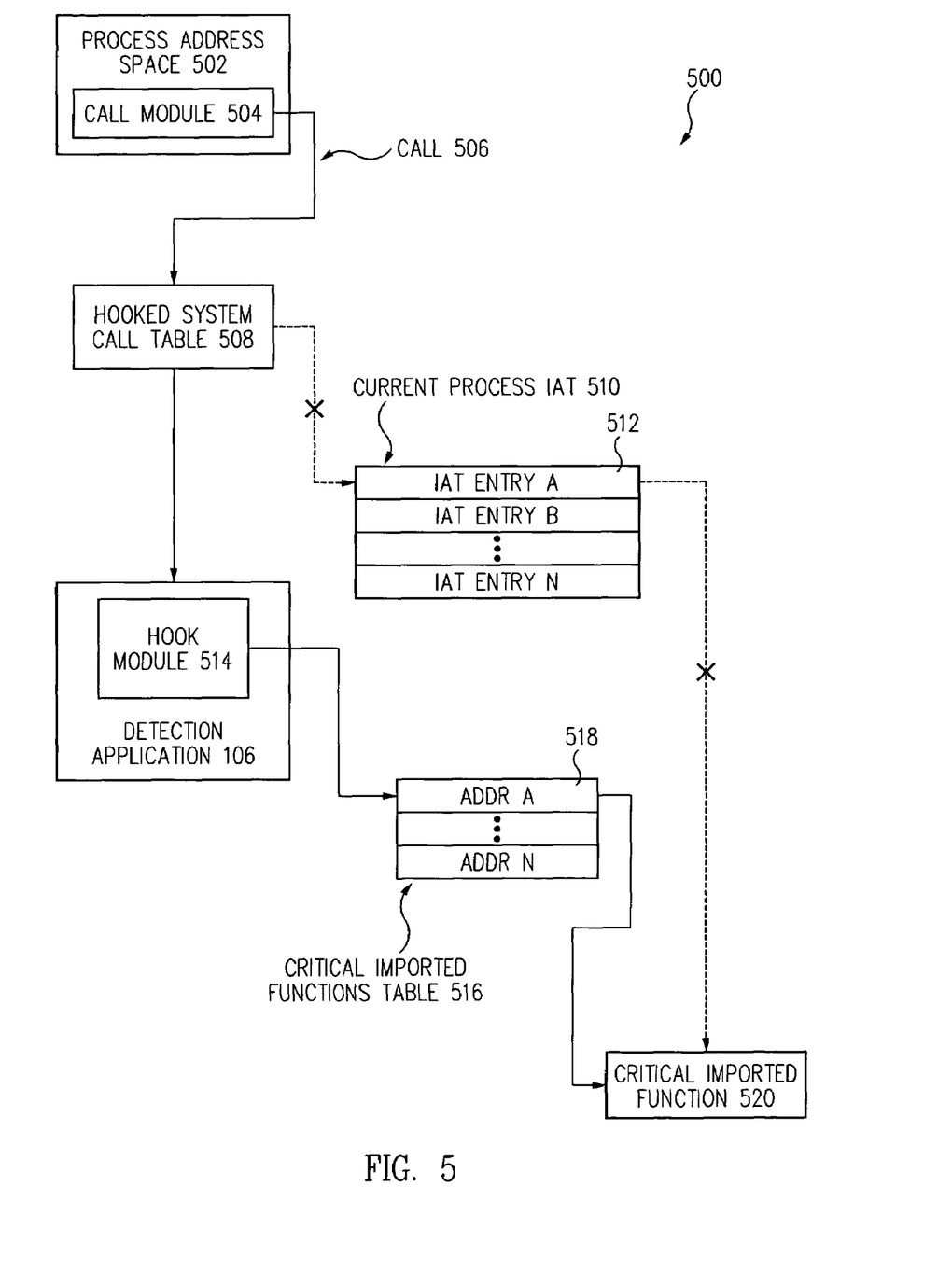
FIG. 5 is a diagram illustrating calling a critical imported function using a critical imported functions table in accordance with one embodiment of the invention.

FIG. 5 is a diagram 500 illustrating calling a critical imported function 520 using a critical imported functions table 516 in accordance with one embodiment of the invention. Referring now to FIG. 5, in one embodiment, in diagram 500 a call 506 to a critical imported function 520 is originated from a call module 504 within a process address space 502 of a process protected by HIDS application 114.

Call 506 is communicated to a hooked system call table 508 that was earlier hooked by detection application 106. Rather than accessing critical imported function 520 through a corresponding IAT entry A 512 of a current process IAT 510, call 506 is redirected to detection application 106, e.g., to a hook module 514. Call 506 is stalled and redirected to an ADDR A 518 (a resolved address of critical imported function 520) in critical imported functions table 516. In one embodiment, call 506 is stalled by detection application 106 and detection application 106, e.g., hook module 514, originates a call to critical imported function 520 using ADDR A 518 in critical imported functions table 516.

Referring back again to FIG. 2 and method 200, thus at operation 216, a call to a critical function, which HIDS application 114 depends upon for data integrity, is redirected from a current process IAT that may have been modified by malicious code attempting to evade detection to a critical imported functions table that was resolved at start up, dynamically allocated, and marked read only. From REDIRECT CALL TO CRITICAL IMPORTED FUNCTION USING CRITICAL IMPORTED FUNCTIONS TABLE operation 216, processing transitions to an EVASION ATTEMPT DETECTED IN CURRENT PROCESS IAT check operation 218.

In EVASION ATTEMPT DETECTED IN CURRENT PROCESS IAT check operation 218, the call redirection is further used as an opportunity to evaluate the corresponding current process IAT for changes that are indicative of malicious code attempting to evade detection. In one embodiment, the current process IAT associated with the critical imported function is analyzed to determine whether a malicious code evasion attempt is detected. One embodiment of a method for determining whether an evasion attempt is detected in the current process IAT associated with a critical imported function is further described with reference to FIGS. 3 and 4.

If an evasion attempt is not detected ("NO"), from EVASION ATTEMPT DETECTED IN CURRENT PROCESS IAT check operation 218, processing transitions to an EXIT operation 224 with processing exiting method 200. In some embodiments, rather than exiting method 200 at EXIT operation 224, processing returns to operation 214.

Alternatively, if an evasion attempt is detected ("YES"), from EVASION ATTEMPT DETECTED IN CURRENT PROCESS IAT check operation 218, processing transitions to a NOTIFY operation 220.

In NOTIFY operation 220, a user of host computer system 102 and/or a system administrator are notified that malicious code and/or an evasion attempt has been detected on host computer system 102. The user and/or system administrator can be notified using any one of a number of techniques, such as by using a pop up window, by writing to a file, and/or otherwise by logging the event. Further, a notification can be provided to a security center. From NOTIFY operation 220, processing transitions to an optional PROTECTIVE ACTION operation 222, directly to EXIT operation 224, or returns to operation 214, if optional PROTECTIVE ACTION operation 222 is not performed.

In optional PROTECTIVE ACTION operation 222, in one embodiment, a copy of the current process IAT is made and saved for analysis. In some embodiments, the copy of the current process IAT is dumped to a text file, or sent to a user, system administrator, and/or security center. In particular, as the code pages the current process. IAT entry now illegitimately points to may be specific to a particular exploit/worm, the copy of the current process IAT can be analyzed to uniquely identify the exploit or worm.

In one embodiment, the user is prompted for input prior to making and/or sending the copy of the current process IAT, e.g., the user is asked for permission to take the protective action. From optional PROTECTIVE ACTION operation 222, processing transitions to EXIT operation 224, or returns to operation 214.

Figure 3:
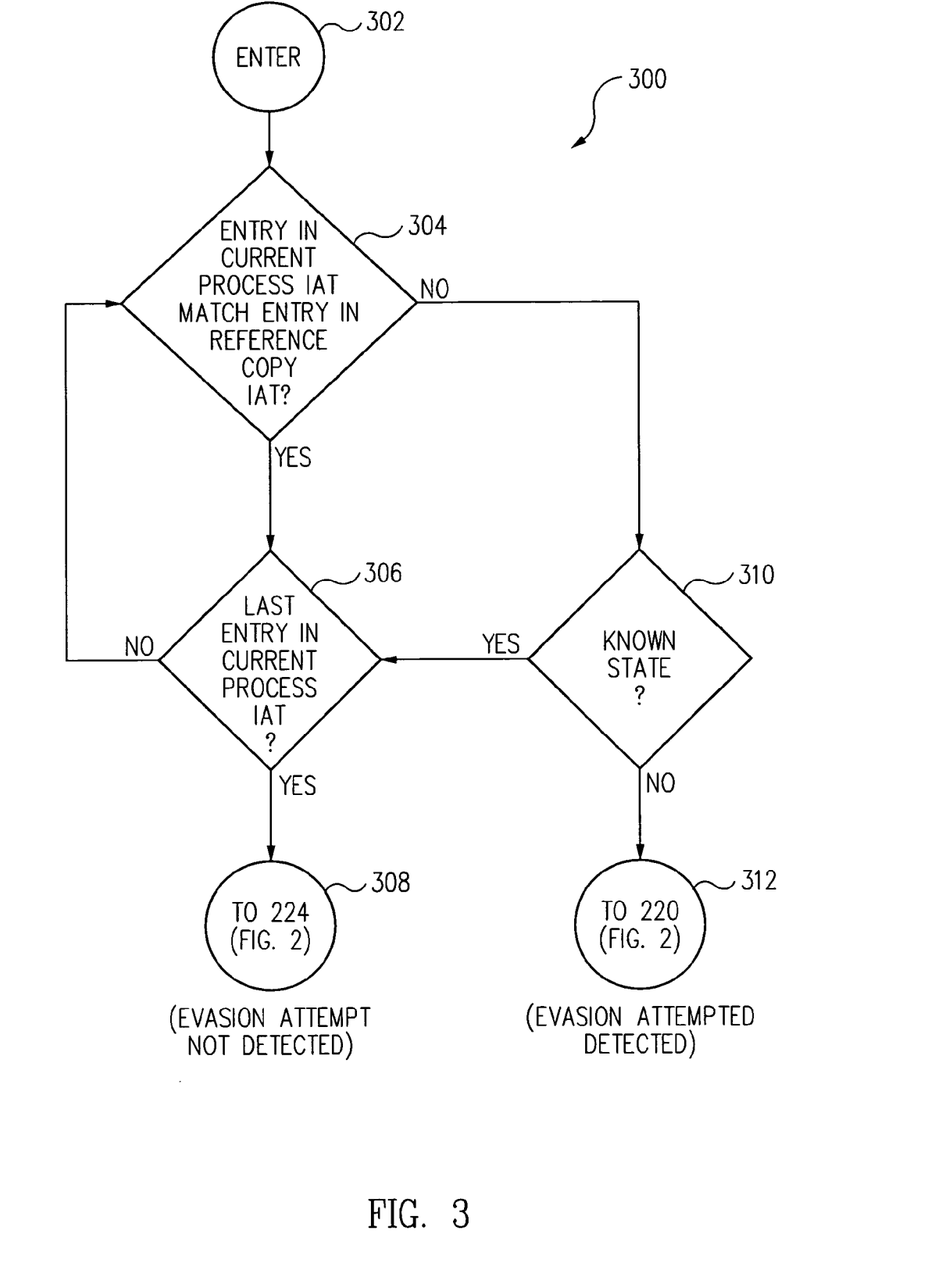
FIG. 3 illustrates a flow diagram of a method for determining whether an evasion attempt is detected in a current process IAT in accordance with one embodiment of the invention.
Figure 6:
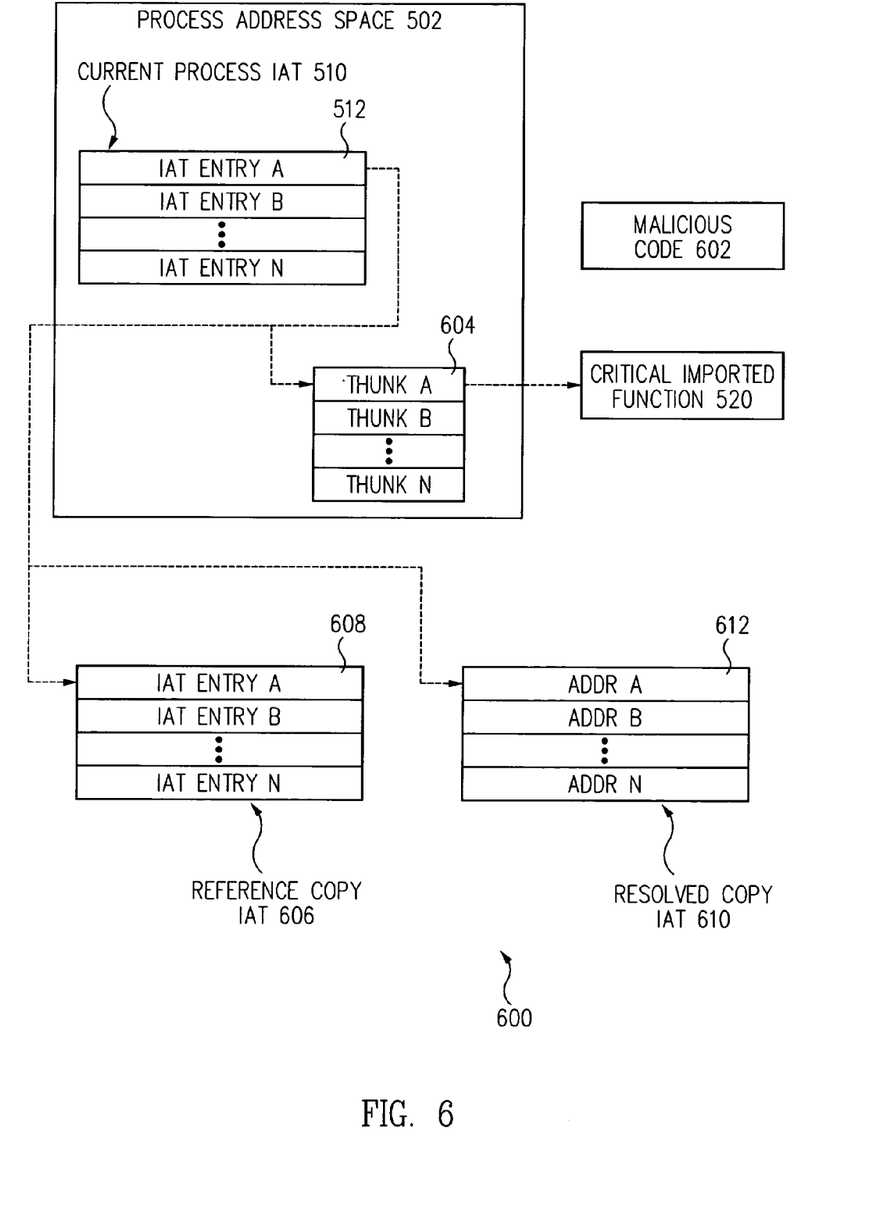
FIG. 6 is a diagram illustrating determining whether an evasion attempt is detected in a current process IAT in accordance with one embodiment of the invention.

FIG. 3 illustrates a flow diagram of a method 300 for determining whether an evasion attempt is detected in a current process IAT in operation 218 of FIG. 2 in accordance with one embodiment of the invention. The operations of FIG. 3 and method 300 are described herein with reference to FIG. 6. FIG. 6 is a diagram 600 illustrating determining whether an evasion attempt is detected in a current process IAT in accordance with one embodiment of the invention.

Referring now to FIGS. 3 and 6 together, in one embodiment, method 300 is entered at ENTER operation 302 from operation 216 (FIG. 2), and processing transitions from ENTER operation 302 to a ENTRY IN CURRENT PROCESS IAT MATCH ENTRY IN REFERENCE COPY IAT check operation 304.

In ENTRY IN CURRENT PROCESS IAT MATCH ENTRY IN REFERENCE COPY IAT check operation 304, an entry in the current process IAT, i.e., a first entry, is compared to a corresponding entry in a reference copy IAT to determine whether the current process IAT entry has changed from the initial start up state. For example, in FIG. 6, IAT entry A 512 in current process IAT 510 is compared to IAT entry A 608 in reference copy IAT 606, which is a copy of the entry in the start up state.

In one embodiment, if the entry in the current process IAT matches the corresponding entry in the reference copy IAT ("YES"), it is assumed that there has been no change made to the entry in the current process IAT from the start up state.

Thus, in FIG. 6, if IAT entry A 512 matches IAT entry A 608, IAT entry A 512 has not changed from the initial start up state. Consequently, it is assumed that malicious code has not modified the entry in the current process IAT, for example to evade detection by HIDS application 114. From ENTRY IN CURRENT PROCESS IAT MATCH ENTRY IN REFERENCE COPY IAT check operation 304, processing transitions to a LAST ENTRY IN CURRENT PROCESS IAT check operation 306.

In LAST ENTRY IN CURRENT PROCESS IAT check operation 306, a determination is made whether the entry in the current process IAT evaluated in check operation 304 is the last entry in the current process IAT, e.g., whether a next entry is present for evaluation in the current process IAT. In FIG. 6, current process IAT 510 includes IAT ENTRY B through IAT ENTRY N, and thus IAT entry A 512 is not the last entry in current process IAT 510. If the entry evaluated in check operation 304 is not the last entry in the current process IAT ("NO"), processing transitions from LAST ENTRY IN CURRENT PROCESS IAT check operation 306, and returns to check operation 304 with the next entry in the current process IAT for evaluation.

Otherwise, if the entry evaluated in check operation 304 is the last entry in the current process IAT ("YES"), e.g., IAT entry B through IAT entry N in current process IAT 510 of FIG. 6 were not present, processing transitions from LAST ENTRY IN CURRENT PROCESS IAT check operation 306 to operation 308 with processing exiting method 300 and transitioning to EXIT operation 224 of process 200 (FIG. 2).

Referring again to ENTRY IN CURRENT PROCESS IAT MATCH ENTRY IN REFERENCE COPY IAT operation 304, alternatively, if the entry in the current process IAT does not match the corresponding entry in the reference copy IAT ("NO"), it is assumed there the entry in the current process IAT has changed from the start up state. For example, in FIG. 6, if IAT entry A 512 did not match IAT entry A 608, IAT entry A 512 has changed from the initial start up state. Further evaluation is needed to determine whether the change is indicative of a malicious code evasion attempt. From ENTRY IN CURRENT PROCESS IAT MATCH ENTRY IN REFERENCE COPY IAT check operation 304, processing transitions to KNOWN STATE check operation 310.

In KNOWN STATE check operation 310, the changed entry in the current process IAT is evaluated to determine whether it is a known state. In one embodiment, a changed entry in a current process IAT is a known state if it identifies a location within the address space allocated to the current process or if it matches a corresponding entry in the resolved copy IAT. Otherwise, the changed entry in the current process IAT is determined not to be to a known state and indicative of a malicious code evasion attempt. One embodiment of a method for determining whether a changed entry in a current process IAT is a known state is further described herein with reference to FIG. 4 and method 400.

If the changed entry in the current process IAT is determined to be to a known state, i.e., not indicative of malicious code ("YES"), processing transitions from KNOWN STATE check operation 310 to LAST ENTRY IN CURRENT PROCESS IAT check operation 306 as earlier described.

Alternatively, if the changed entry in the current process IAT is determined not to be a known state, i.e., indicative of malicious code ("NO"), a determination is made that a malicious code evasion attempt is detected in the current process IAT. From KNOWN STATE operation 310, processing exits method 300 at operation 312 and transitions to operation 220 (FIG. 2). Thus in one embodiment, when a changed entry in a current process IAT is found that is not a known state, i.e., is indicative of a malicious code evasion attempt, any remaining entries in the current process IAT are not checked, and processing returns to method 200.

In an alternative embodiment, each entry in the current process IAT is checked prior to processing returning to method 200. Thus, rather than processing returning to method 200 at operation 312 when an evasion attempt is first detected, entries in the current process IAT that are not a known state, e.g., indicative a malicious code evasion attempt, are flagged and processing transitions to operation 306 until the last entry in the current process IAT is evaluated. If each of the entries in the current process IAT either match a corresponding entry in the reference copy IAT or are a known state, processing transitions to operation 224 as earlier described. Otherwise, if an entry in the current process IAT is flagged as not to a known state, processing transitions to operation 220 as earlier described.

Figure 4:
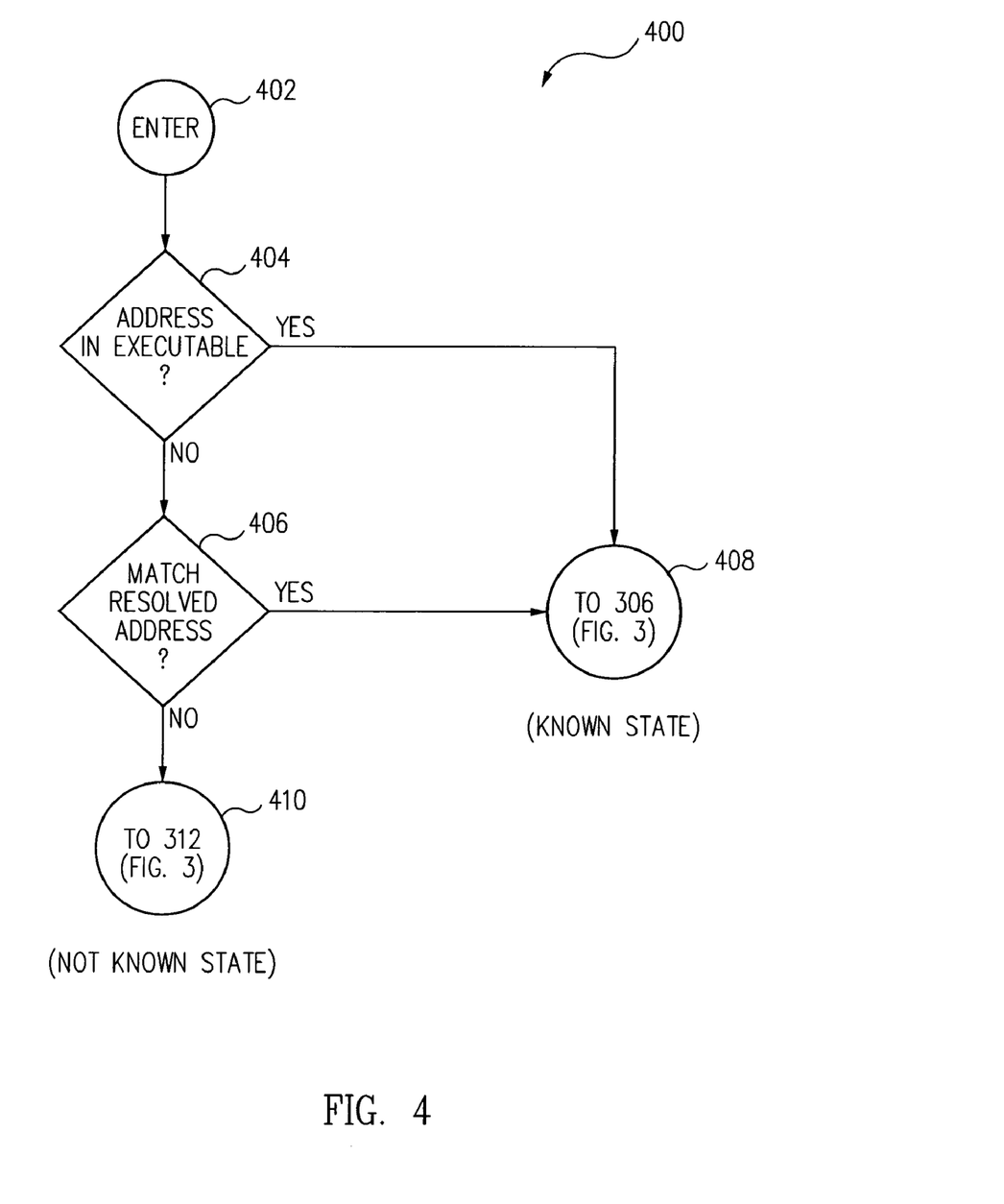
FIG. 4 illustrates a flow diagram of a method for determining whether a changed entry in a current process IAT is a known state in accordance with one embodiment of the invention.

FIG. 4 illustrates a flow diagram of a method 400 for determining whether a changed entry in a current process IAT is a known state in accordance with one embodiment of the invention. Referring now to FIGS. 4 and 6 together, in one embodiment, processing transitions to method 400 from operation 304 (FIG. 3) at an ENTER operation 402. From ENTER operation 402, processing transitions to an ADDRESS IN EXECUTABLE check operation 404.

In ADDRESS IN EXECUTABLE check operation 404, the entry in the current process IAT is evaluated to determine whether it identifies a location within the main executable image of the process in the process address space. In one embodiment, the entry in the current process IAT is read and a determination is made whether the entry identifies an address location, such as an offset, within the main executable image of the process, i.e., within the address space allocated to the executable file itself, not one that is imported. For example, in one embodiment, a determination is made whether the entry identifies an address location within a minimum/maximum address range allocated to the main executable image of the current process. The determination of an address range allocated to a main executable image of a process is well-known to those of skill in art and is not further described herein.

If the entry in the current process IAT identifies an address location within the address range allocated to the main executable image of the process, the entry in the current process IAT is determined to identify a location within the executable file of the process, otherwise, it is not determined to identify an address location within the executable file of the process.

If the current process IAT entry identifies a location within the main executable file image of the process ("YES"), it is assumed the location is associated with thunk code. Thus, the changed entry in the current process IAT is a known state and not indicative of malicious code, e.g., not indicative of an evasion attempt. For example, in FIG. 6, thunk A 604 is present in the process address space 502 allocated to the main executable image of the process and is used to resolve the address of the critical imported function, e.g., critical imported function 520. If IAT entry A 512 identifies the location of thunk A 604 in the process address space 502, IAT entry A 512 is a known state. From ADDRESS IN EXECUTABLE check operation 404, processing exits method 400 at operation 408 and transitions to operation 306 (FIG. 3).

Referring again to ADDRESS IN EXECUTABLE check operation 404, alternatively, if the entry in the current process IAT does not identify a location within the main executable file image of the process ("NO"), it is assumed the location is not associated with thunk code. Thus, the changed entry in the current process IAT is not a known state and indicative of malicious code, e.g., indicative of an evasion attempt. For example, in FIG. 6, malicious code 602 may be present at an address on host computer system 102 that is not within process address space 502. If IAT entry A 512 identifies the location of malicious code 602 that is not within process address space 502 allocated to the main executable image of the process, IAT entry A 512 is not a known state. From ADDRESS IN EXECUTABLE check operation 404, processing transitions to a MATCH RESOLVED ADDRESS check operation 406.

In MATCH RESOLVED ADDRESS check operation 406, the entry in current process IAT is evaluated to determine whether it matches a resolved address corresponding to the critical imported function. In one embodiment, the entry in the current process IAT is read and a determination is made whether the entry in the current process IAT matches a corresponding entry in a resolved copy IAT. For example, in FIG. 6 IAT entry A 512 in current process IAT 510 is compared to corresponding ADDR A 612 in resolved copy IAT 610.

If the entry in the current process IAT matches the corresponding entry in the resolved copy IAT entry, i.e., the resolved address of the critical imported function ("YES"), the entry in the current process IAT is determined to be a known state and is not indicative of malicious code, e.g., not indicative of an evasion attempt. In FIG. 6, if IAT entry A 512 matches ADDR A 612, IAT entry A 512 is determined to be a known state. From MATCH RESOLVED ADDRESS check operation 406, processing exits method 400 at operation 408 and transitions to operation 306 (FIG. 3) as earlier described.

Alternatively, if the entry in the current process IAT does not match a corresponding entry in a resolved copy IAT, i.e., the resolved address of the critical imported function ("NO"), the entry in the current process IAT is assumed not to identify a known state and is indicative of malicious code, e.g., is indicative of an evasion attempt. In FIG. 6, if IAT entry A 512 of current process IAT 510 does not match ADDR A 612, IAT entry A 512 is not determined to be a known state. From MATCH RESOLVED ADDRESS check operation 406, processing exits method 400 at operation 410 and transitions to operation 312 (FIG. 3).

Thus, in accordance with the invention, critical imported functions utilized by an application, such as a HIDS application, are hooked so that a call, or other invocation of, a critical imported function is redirected through a critical imported functions table rather than a current process IAT. The call redirection is further used as an opportunity to evaluate the corresponding current process IAT for changes that are indicative of malicious code attempting to evade detection. If an evasion attempt is detected in the current process IAT, a notification is provided to a user/system administrator and optionally protective action is taken, such as saving a copy of the current process IAT for later analysis.

Referring again to FIG. 1, detection application 106 is in computer memory 112. As used herein, a computer memory refers to a volatile memory, a non-volatile memory, or a combination of the two.

Although detection application 106 is referred to as an application, this is illustrative only. Detection application 106 should be capable of being called from an application, e.g., HIDS application 114, or the operating system, e.g., operating system 104.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for host computer and client-server configurations, embodiments of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network. Further herein, a means for performing a particular function is accomplished using the appropriate computer-readable code and the related hardware necessary to performing the function.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the detection functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the present invention can be implemented in a wide variety of computer system configurations. In addition, the embodiments of the present invention can be stored as different modules in memories of different devices.

For example, detection application 106 could initially be stored in server computer system 130, and then as necessary, a portion of detection application 106 could be transferred to host computer system 102 and executed on host computer system 102. Consequently, part of detection application 106 would be executed on processor 134 of server computer system 130, and another part would be executed on processor 108 of host computer system 102.

In yet another embodiment, detection application 106 is stored in memory 136 of server computer system 130. Detection application 106 is transferred over network 126 to memory 112 in host computer system 102. In this embodiment, network interface 138 and I/O interface 110 would include analog modems, digital modems, or a network interface card. If modems are used, network 126 includes a communications network, and detection application 106 is downloaded via the communications network. In view of this disclosure, those of skill in the art can implement various embodiments of the present invention in a wide-variety of physical hardware configurations using an operating system and computer programming language of interest to the user.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   locating an initial process import address table (IAT) of a process, said initial process IAT including one or more initial process IAT entries corresponding to one or more imported functions, said one or more initial process IAT entries including at least one initial process IAT entry corresponding to a critical imported function;
   generating a critical imported functions table, said critical imported functions table including at least one critical imported functions table entry, wherein said critical imported functions table entry includes an address in memory corresponding to said critical imported function;
   generating a reference copy IAT, said reference copy IAT including one or more reference copy IAT entries that are copies of said one or more initial process IAT entries;
   generating a resolved copy IAT, said resolved copy IAT including one or more resolved copy IAT entries, wherein each of said one or more resolved copy IAT entries includes an address for a corresponding one of each of said one or more initial process IAT entries;
   hooking said critical imported function;
   stalling a call to said critical imported function thereby preventing said call from reaching said critical imported function; and
   redirecting said call to said critical imported function utilizing said critical imported functions table entry corresponding to said critical imported function.

2. The method of claim 1, further comprising:
   determining whether an evasion attempt is detected in a current process IAT including a current process IAT entry corresponding to said critical imported function.

3. The method of claim 2, further comprising:
   if said evasion attempt is detected in said current process IAT, generating a notification of said evasion attempt.

4. The method of claim 2, further comprising:
   if said evasion attempt is detected in said current process IAT, taking protective action.

5. The method of claim 4, wherein said taking protective action includes saving a copy of said current process IAT to a text file.

6. A method comprising:
   locating an initial process import address table (IAT) of a process, said initial process IAT including one or more initial process IAT entries corresponding to one or more imported functions, said one or more initial process IAT entries including at least one initial process IAT entry corresponding to a critical imported function;
   generating a critical imported functions table, said critical imported functions table including at least one critical imported functions table entry, wherein said critical imported functions table entry includes an address in memory corresponding to said critical imported function;
   generating a reference copy IAT, said reference copy IAT including one or more reference copy IAT entries that are copies of said one or more initial process IAT entries;
   generating a resolved copy IAT, said resolved copy IAT including one or more resolved copy IAT entries, wherein each of said one or more resolved copy IAT entries includes an address for a corresponding one of each of said one or more initial process IAT entries;
hooking said critical imported function;
stalling a call to said critical imported function; and
redirecting said call to said critical imported function utilizing said critical imported functions table entry corresponding to said critical imported function;
determining whether an evasion attempt is detected in a current process IAT including a current process IAT entry corresponding to said critical imported function, wherein said determining whether an evasion attempt is detected in a current process IAT comprises:
determining whether said current process IAT entry matches a corresponding reference copy IAT entry in said reference copy IAT;
if said current process IAT entry matches said corresponding reference copy IAT entry, determining whether said current process IAT entry is a last current process IAT entry;
if said current process IAT entry is said last current process IAT entry, determining said evasion attempt is not detected in said current process IAT;
if said current process IAT entry is not said last current process IAT entry, determining whether a next current process IAT entry matches a corresponding reference copy IAT entry in said reference copy IAT;
if said current process IAT entry does not match said corresponding reference copy IAT entry, determining whether said current process IAT entry is a known state;
if said current process IAT entry is not said known state, determining said evasion attempt is detected in said current process IAT;
if said current process IAT entry is said known state, determining whether said current process IAT entry is said last current process IAT entry;
if said current process IAT is said last current process entry, determining no evasion attempt is detected in said current process IAT; and
if said current process IAT is not said last current process entry, determining whether a next current process IAT entry matches a corresponding reference copy IAT entry in said reference copy IAT.

7. The method of claim 6, wherein said determining whether said current process IAT entry is a known state comprises:
determining whether said current process IAT entry identifies a location in a main executable image of said current process in a process address space allocated to said process;
if said current process IAT entry identifies said location in said main executable image of said current process, determining said current process IAT entry is a known state;
if said current process IAT entry does not identify said location in said main executable image of said current process, determining whether said current process IAT entry matches a corresponding resolved copy IAT entry in said resolved copy IAT;
if said current process IAT entry does not match said corresponding resolved copy IAT entry, determining said current process IAT entry is not a known state;
if said current process IAT entry matches said corresponding resolved copy IAT entry, determining said current process IAT entry is a known state.

8. The method of claim 1, wherein said critical imported functions table is dynamically allocated and marked read-only.

9. The method of claim 1, wherein said reference copy IAT is dynamically allocated and marked read-only.

10. The method of claim 1, wherein said resolved copy IAT is dynamically allocated and marked read-only.

11. A method comprising:
generating a critical imported functions table, said critical imported functions table including an entry corresponding to a critical imported function;
hooking a call to said critical imported function;
stalling said call to said critical imported function thereby preventing said call from reaching said critical imported function; and
redirecting execution of said call from an entry corresponding to said critical imported function in a current process import address table (IAT) to said entry corresponding to said critical imported function in said critical imported functions table.

12. The method of claim 11, further comprising:
determining whether an evasion attempt is detected in said current process IAT; and
if said evasion attempt is detected in said current process IAT, providing a notification.

13. The method of claim 12, further comprising:
if said evasion attempt is detected in said current process IAT, taking protective action.

14. A computer-program product comprising a computer readable storage medium containing computer program code for implementing a method comprising:
generating a critical imported functions table, said critical imported functions table including an address of a critical imported function;
hooking a call to said critical imported function;
stalling said call to said critical imported function thereby preventing said call from reaching said critical imported function, said call directed to a current process import address table (IAT) entry in a current process IAT; and
redirecting execution of said call from said current process IAT entry to a corresponding critical imported functions table entry in said critical imported functions table.

15. The computer-program product of claim 14, said method further comprising:
determining whether an evasion attempt is detected in said current process IAT; and
if said evasion attempt is detected in said current process IAT, providing a notification.

16. A system comprising:
means for generating a critical imported functions table including an entry corresponding to a critical imported function;
means for hooking a call to said critical imported function;
means for stalling said call to said critical imported function thereby preventing said call from reaching said critical imported function; and
means for redirecting said call to said critical imported function from an entry corresponding to said critical imported function in a current process import address table (IAT) to said entry in said critical imported functions table.

17. The system of claim 16, further comprising:
means for determining whether an evasion attempt is detected in said current process IAT.

18. The system of claim 16, further comprising:
means for generating a reference copy IAT;
means for generating a resolved copy IAT; and
means for generating a notification of an evasion attempt.

19. A computer-program product comprising a computer readable storage medium containing computer program code comprising:
- a detection application for hooking a call to a critical imported function;
- said detection application further for stalling said call to said critical imported function thereby preventing said call from reaching said critical imported function; and
- said detection application further for redirecting execution of said call to said critical imported function from a corresponding entry in a current process import address table (IAT) to a corresponding entry in a critical imported functions table; and
- said detection application further for detecting whether said current process IAT is modified by malicious code.

20. The computer-program product of claim 19, further comprising:
- upon detecting said current process IAT is modified by malicious code, said detection application further for providing a notification of said detection.

* * * * *